(12) United States Patent
Chen

(10) Patent No.: US 8,839,415 B2
(45) Date of Patent: Sep. 16, 2014

(54) BLANK SMART CARD DEVICE ISSUANCE SYSTEM

(75) Inventor: Ben Wei Chen, Fountain Valley, CA (US)

(73) Assignee: Kingston Technology Corporation, Fountain Valley, CA (US)

( * ) Notice: Subject to any disclaimer, the term of this patent is extended or adjusted under 35 U.S.C. 154(b) by 233 days.

(21) Appl. No.: 13/019,180

(22) Filed: Feb. 1, 2011

(65) Prior Publication Data

US 2012/0198548 A1    Aug. 2, 2012

(51) Int. Cl.
*G06F 12/14* (2006.01)
*H04L 9/32* (2006.01)
*G06Q 20/34* (2012.01)
*G06K 19/077* (2006.01)
*H04L 9/08* (2006.01)
*G06F 21/33* (2013.01)
*G06F 21/44* (2013.01)
*G06K 17/00* (2006.01)

(52) U.S. Cl.
CPC ........ *G06K 19/07716* (2013.01); *H04L 9/3268* (2013.01); *G06Q 20/355* (2013.01); *G06K 2017/0041* (2013.01); *H04L 9/0891* (2013.01); *H04L 9/0869* (2013.01); *H04L 9/3247* (2013.01); *H04L 9/3226* (2013.01); *G06F 21/33* (2013.01); *G06F 21/445* (2013.01)
USPC .......... 726/19; 726/5; 726/6; 726/26; 726/27; 713/169; 713/172

(58) Field of Classification Search
CPC ................. G06K 19/07716; G06K 19/07732; H04L 9/0869; H04L 9/3226; H04L 9/3234; H04L 9/3263; H04L 9/3247; H04L 9/3268; H04L 9/3271; H04L 63/0838; H04L 63/0853; H04L 63/0815; H04L 2209/56; H04L 2209/805; H04L 2209/0816; G06F 21/445; G06F 21/31; G06F 21/33; G06F 21/34; G06F 21/79
USPC ........ 726/5, 6, 7, 9, 19, 26, 27; 713/169, 172; 705/35, 40, 44, 67, 64; 235/381, 488, 235/492

See application file for complete search history.

(56) References Cited

U.S. PATENT DOCUMENTS

| | | | |
|---|---|---|---|
| 5,534,857 A | 7/1996 | Laing et al. | |
| 5,943,423 A | 8/1999 | Muftic | |
| 6,067,621 A | 5/2000 | Yu et al. | |
| 6,141,752 A | 10/2000 | Danc et al. | |
| 6,769,622 B1 | 8/2004 | Tournemille et al. | |
| 6,776,332 B2 | 8/2004 | Allen et al. | |
| 6,850,916 B1 | 2/2005 | Wang | |
| 7,469,339 B2 * | 12/2008 | Everett et al. | 713/172 |
| 2006/0050871 A1 | 3/2006 | Ranen et al. | |
| 2007/0158408 A1 | 7/2007 | Wang et al. | |
| 2008/0041940 A1 | 2/2008 | Weeks | |
| 2008/0229105 A1 * | 9/2008 | Jeffries et al. | 713/169 |
| 2010/0023650 A1 | 1/2010 | Prevost et al. | |
| 2010/0162377 A1 * | 6/2010 | Gonzalez et al. | 726/9 |

FOREIGN PATENT DOCUMENTS

| CN | 201044180 | 4/2008 |
|---|---|---|
| KR | 20050037902 | 4/2005 |

OTHER PUBLICATIONS

Cristian Radu, Implementing Electronic Card Payment Systems, Artech House-Computer Security Series, 2003 http://books.google.com/books?id=oUoQU5RfQzcC&printsec=frontcover&dq=%22impleme.

Wolfgang Rankl and Wolfgang Effing, Smart Card Handbook, Third Edition, 2002 http://books.google.com/books?id=C55-4kVUQ14C&printsec=frontcover&dq=smart+card.

Tim Jurgensen and Scott Guthery, Smart Cards: The Developer's Toolkit, Pearson Education Inc., 2002 http://books.google.com/books?id=TyniOOmvzKEC&printsec=frontcover&dq=Smart+card.

Jan De Clercq, Smart Cards, Microsoft TechNet, 2009, pp. 1-22.

Shivaram H. Mysor, Windows Vista Smart Card Infrastructure, Microsoft, 2007, pp. 1-54.

Eun-Jun Yoon and Kee-Young Yoo, Robust Key Exchange Protocol between Set-Top Box and Smart Card in DTV Broadcasting, Informatica, 2009, vol. 20, No. 1, pp. 139-150.

Xiao-Min Wang, et al, Cryptanalysis and improvement on two efficient remote user authentication scheme using smart cards, Computer Standards & Interfaces, 2006, pp. 507-512.

Zuowen Tan, An Enhanced Three-Party Authentication Key Exchange Protocol for Mobile Commerce Environments, Journal of Communications, vol. 5, No. 5, May 2010, pp. 436-443.

\* cited by examiner

*Primary Examiner* — Kambiz Zand
*Assistant Examiner* — Noura Zoubair
(74) *Attorney, Agent, or Firm* — Sawyer Law Group, P.C.

(57) ABSTRACT

A smart card issuance system and method are disclosed. In a first aspect a method and system for issuing a smart card device (SC) is disclosed. The method and system comprise providing an initialization phase of the SC by a manufacturer and providing an authentication phase of the SC by the manufacturer. The method and system also include deploying the SC, providing a first time authentication phase for a specific customer by the issuer (IS) after the SC is deployed and starting a first phase of the registration process of the SC for the specific customer by the issuer. The method and system further include providing another authentication phase of the SC by IS after the first time authentication; and providing of an authentication of the IS by the SC. When both the SC and IS are mutually authenticated, the IS and the specific customer are allowed to complete the registration process. In a second aspect, a data transmission process and system for a smart card device (SC) of an issuer (IS) is disclosed. The process and system comprises performing a login of the SC by a user and performing a mutual authentication of the SC and the IS. The process and system further includes establishing a session key after mutual authentication is established. The session key is used to encrypt and decrypt data for transmission between the IS and the SC.

7 Claims, 14 Drawing Sheets

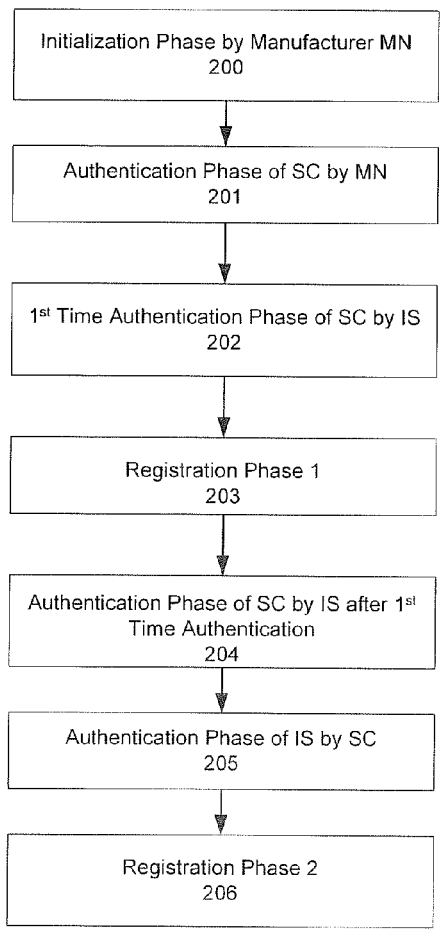
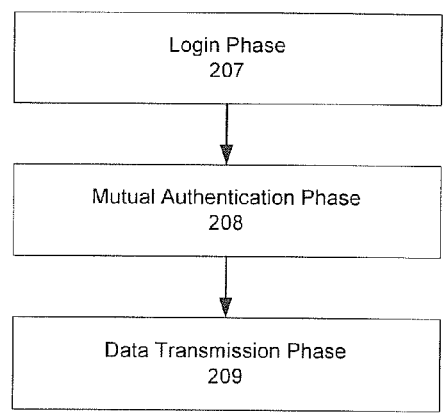
Figure 2B
Figure 2A

BLANK SMART CARD DEVICE ISSUANCE SYSTEM

FIELD OF THE INVENTION

The present invention relates generally to bank card systems and more particularly relates to a method and system for providing a bank (IC) card for commercial use.

BACKGROUND

Smart card technology has been used for years in the banking industry. The technology allows for issuing a client a bank card (a.k.a. IC card), with an embedded smart card IC. The technology relies on the robustness of the public key infrastructure (PKI) along with other field proven encryption mechanism to provide a secure platform to conduct e-commerce services. The IC card holds customer account information and serves as one of the factors of authentication, in addition to PIN and/or password, to authorize the customer for access and operation to financial resources available through ATM kiosk or web. Usually, a USB-based smart card reader is provided to the customer, if a web access is required. Due to security concerns, the IC cards are always issued by the bank directly to its customers. The IC card issuance process involves:

1. Have the customer open up an account with the bank.
2. The bank initializes the blank IC card in its card making facility.
3. The bank personalizes the IC card with the customer account information.
4. The IC card is sent to the customer via mail.
5. The customer activates the IC card through phone or web.

The IC card has a few unique and robust features, compared with other traditional proprietary encryption/decryption mechanism:

1. It is virtually clone-proof.
2. The smart card IC in use is certified to be tamper-resistant.
3. Its strength and weakness are well understood and deterministic.
4. It is field proven in the past twenty years.

As the USB drive becomes ubiquitous and cost effective, it become apparent that a smart card IC could be embedded with a standard USB drive (a.k.a. Smart Card Device) to replace the above mentioned USB-based smart card reader and an IC card. The architecture of the Smart Card Device is fully compatible with the existing solution with the combination of a USB-based smart card reader and an IC card. If the Smart Card Device is properly initialized and personalized and issued, there is no reason it can not perform each and all functions of the existing IC card. In addition, the Smart Card Device has one added advantage of internal flash storage that can be used for content protection and delivery purpose. It therefore expands the scope of application of IC card beyond what it can address at present. By utilizing the clone-proof feature of the smart card IC embedded on a USB Smart Card Device, it allows the content owner to store a unique key and/or a set of keys that can later be used to encrypt and decrypt media content or a software package for protection and secure delivery to the consumers.

Based on the same business model of the issuance of IC card, a unique Smart Card Device can be issued by a specific content owner to each and every one of its customers. The Smart Card Device can then be used by the customer in a kiosk or through web, to acquire the content or services available through his account. The type of content or services include, but not limit to, audio, video, software package, game, e-book and financial products. The existing business model of IC card works well in banking industry, as it is a more captive market and application. There are a number of parameters govern current IC card market and application:

1. The IC card can only be initialized, personalized and issued by a specific issuer.
2. Limited number of banks to issue IC card.
3. Great security concern.
4. Brand name recognition of issuer on IC card.
5. Personal verification of the customer on IC card.

Again, all these parameters can be addressed with the Smart Card Device, if it is issued as the same way like an IC card, by a specific issuer.

But due to the content nature of the business model with limitless numbers of content owners, the above mentioned model of specific Smart Card Device issuers may work in a very limited scope. It will be desirable and beneficial that a mechanism developed on Smart Card Device to expand the scope market and application:

1. The Smart Card Device can be purchased as a blank drive through retail channel.
2. The Smart Card Device can be initialized and personalized by the customer in the field.
3. The Smart Card Device can be associated with an account setup with a content/service provider.
4. The Smart Card Device is then considered issued by the content/service provider.
5. It addresses all the security concerns in this new business model.
6. Brand name recognition is addressed electronically and physically.
7. Personal verification is addressed electronically and physically.

Accordingly, what is desired is to provide a system and method that overcomes the above issues. The present invention addresses such a need.

SUMMARY OF THE INVENTION

A smart card issuance system and method are disclosed. In a first aspect a method and system for issuing a smart card device (SC) is disclosed. The method and system comprise providing an initialization phase of the SC by a manufacturer and providing an authentication phase of the SC by the manufacturer. The method and system also include deploying the SC, providing a first time authentication phase for a specific customer by the issuer (IS) after the SC is deployed and starting a first phase of the registration process of the SC for the specific customer by the issuer. The method and system further include providing another authentication phase of the SC by IS after the first time authentication; and providing of an authentication of the IS by the SC. When both the SC and IS are mutually authenticated, the IS and the specific customer are allowed to complete the registration process.

In a second aspect, a data transmission process and system for a smart card device (SC) of an issuer (IS) is disclosed. The process and system comprises performing a login of the SC by a user and performing a mutual authentication of the SC and the IS. The process and system further includes establishing a session key after mutual authentication is established. The session key is used to encrypt and decrypt data for transmission between the IS and the SC.

BRIEF DESCRIPTION OF THE DRAWINGS

FIG. 2A is a flowchart that illustrates a complete initialization and personalization process of a Smart Card Device (SC).

FIG. 2B is a flowchart that illustrates a Data Transmission process of the SC.

DETAILED DESCRIPTION OF PREFERRED EMBODIMENTS

The present invention relates generally to bank card systems and more particularly relates to a method and system for providing a bank (IC) card for commercial use. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present provides a mechanism that provides the following advantages.

1 Cover all existing smart card business model, market and application.

2. Introduce the blank Smart Card Device business model in order to create the market and application not yet existent.

3. Provide a vehicle to address emerging content protection application.

Although the invention addresses "Smart Card Device" specifically, its application applies to IC card or smart card in general as well as to any other interface, such as SD or microSD, with a built-in smart card.

To describe the features of a system and method in accordance with the present invention refer now to the following description in conjunction with the accompanying drawings.

The conventional life cycle of an IC card process includes a number of stages:

1. Manufacturing: Design and fabrication of the smart card IC and the hosting IC card.
2. Card preparation: Load the smart card operating system.
3. Initialization/Personalization: Initialize application and personalize customer information.
4. Operation: Activate the application and usage.
5. Termination: Deactivate the application and card.

In general, in the life cycle of an IC card, there are a number of parties involved, including IC supplier, card manufacturer, OS developer, card issuer, access terminal and customer.

Figure 1:
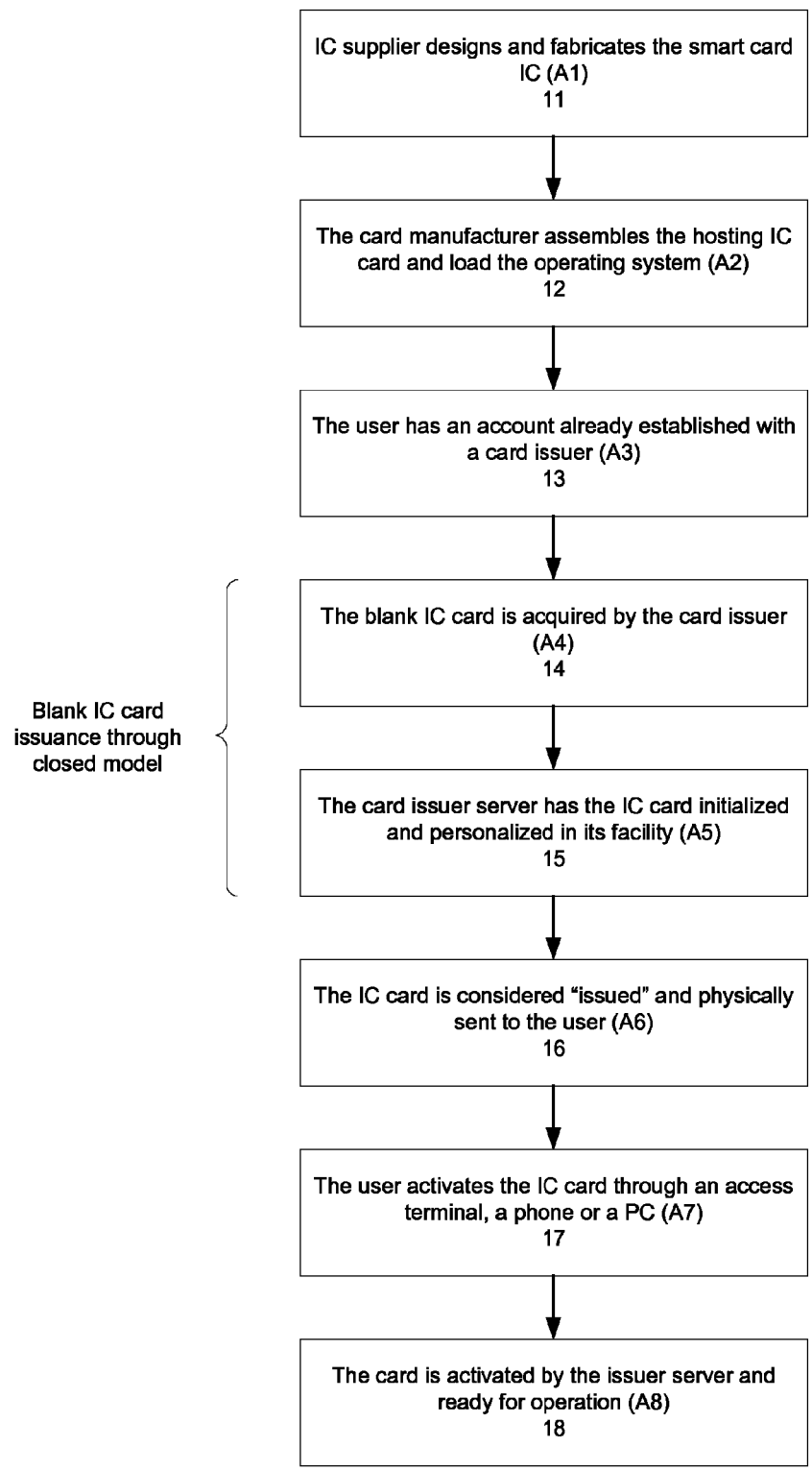
FIG. 1 is a flowchart illustrating a conventional closed model of distribution of an IC card (prior art).

A flow chart of the conventional closed model of distribution of an IC card, as shown in FIG. 1, follows the following steps:

(A1) The IC supplier designs and fabricates the smart card IC. It may also develop the smart card operating system to be loaded into the IC card, via step 11.

(A2) The card manufacturer assembles the hosting IC card and load the operating system developed either by the IC supplier or the card issuer, via step 12.

(A3) The customer has an account already established with a card issuer as in the case of a bank card, or a credit card, via step 13.

(A4) The blank IC card is acquired by the card issuer with the smart card operating system loaded inside, via step 14.

(A5) The card issuer then, based on the specific customer's account information, has the IC card initialized and personalized in its facility, via step 15.

(A6) The IC card is considered "issued" and physically sent to the customer, via step 16.

(A7) The customer activates the IC card through an access terminal, a phone or a PC, via step 17.

(A8) The card is activated by the issuer server and ready for operation, via step 18.

It is important to note that during step 15 (A5) above, the card issuer server conducts initialization and personalization of the IC card through in-house secure channel. The IC card will be loaded with a security certificate of the issuer for use in later authentication process in operation in the field.

By combining the reader function and the smart card into a single Smart Card Device, a system and method in accordance with an embodiment functions as an IC card both in its life cycle and its distribution steps. In addition, an open business model is provided through mechanisms that will be described more in detail below.

Figure 2:
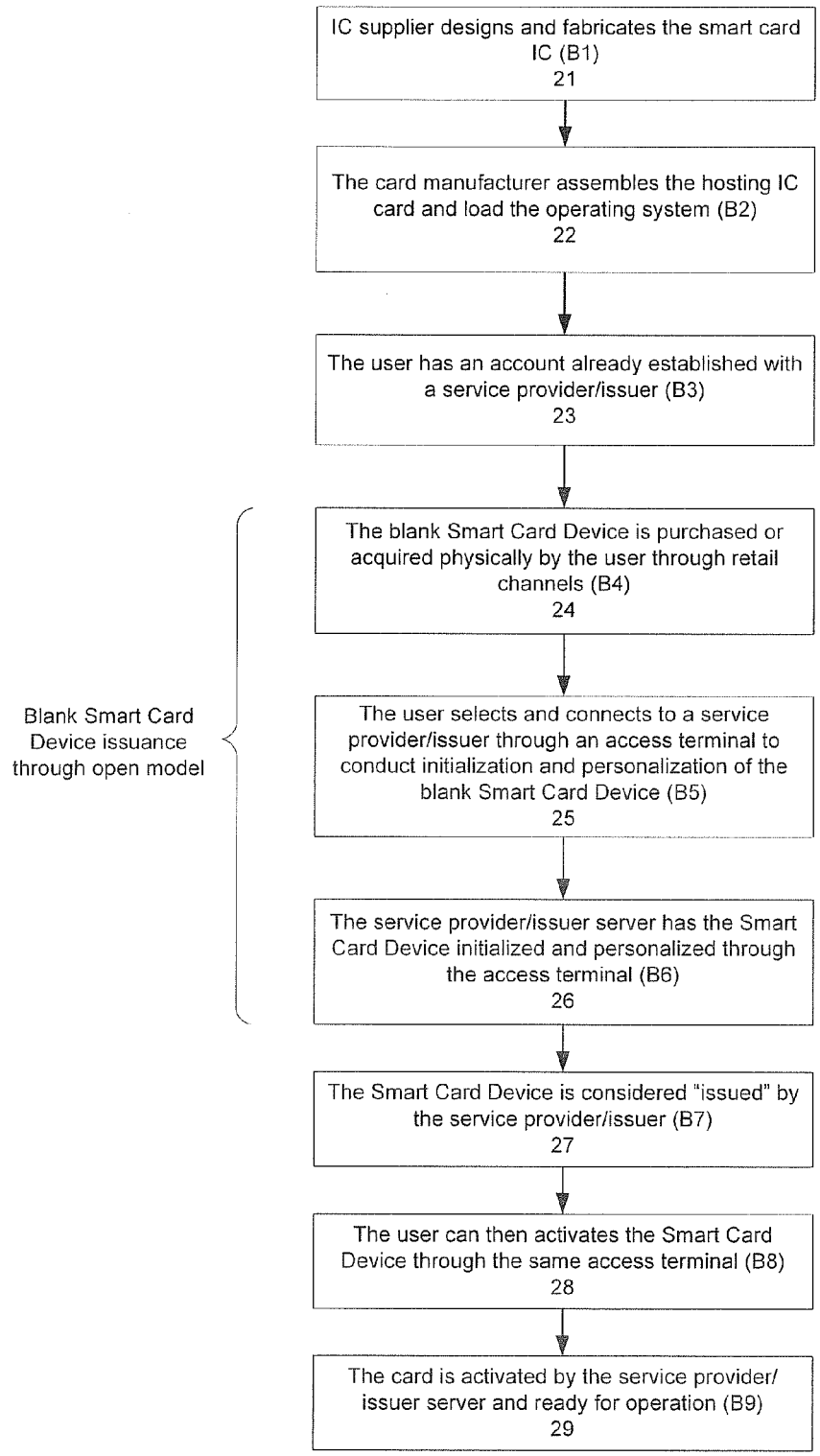
FIG. 2 is a flowchart illustrating an Open model of distribution of a Smart Card Device.

A flow chart that illustrates an open model of distribution of a Smart Card Device, in accordance with an embodiment, is shown in FIG. 2. As is seen the distribution model includes the following steps:

(B1) The IC supplier designs and fabricates the smart card IC. It may also develop the smart card operating system to be loaded into the Smart Card Device, via step 21.

(B2) The card manufacturer assembles the hosting Smart Card Device and load the operating system developed by the IC supplier, via step 22.

(B3) The customer has an account already established with a specific issuer that is a service provider for either tangible content or intangible services, via step 23.

(B4) The Smart Card Device is purchased or acquired physically by the customer through retail channels, marketed any interested party, via step 24.

(B5) The customer can then connect to the service provider/issuer server through an access terminal, most likely a PC, to conduct initialization and personalization of the Smart Card Device, via step 25.

(B6) The service provider/issuer then, based on the specific customer's account information, has the Smart Card Device initialized and personalized through the access terminal, via step 26.

(B7) The Smart Card Device is considered "issued" by the service provider/issuer, via step 27.

(B8) The customer then activates the Smart Card Device through the same access terminal, via step 28.

(B9) The Smart Card Device is activated by the service provider/issuer server and ready for operation, via step 29.

Comparing the closed distribution system of FIG. 1 with the open distribution system of FIG. 2, it is noted that the there are some similarities, but there are significant differences. The IC card issuance through close distribution model includes steps 14 (A4) and 15(A5), while the Smart Card Device issuance through open distribution model includes step 24 (B4) through step 26(B6).

In the conventional close model of distribution of an IC card as depicted in FIG. 1, the IC card is acquired by the card issuer, via step 14, and is therefore associated with the card issuer. The IC card is then initialized and personalized in the card issuer facility through proprietary and secure channel with specific customer account information. The process is usually costly, inflexible and time-consuming. It is therefore advantageous to provide a blank smart card issuance system such that the IC card can be initialized and personalized remotely and securely in the field by the user. The location to personalize the smart card can be through the user's PC via Internet connection or through a public kiosk with internet access. Unlike the conventional model, the Smart Card Device is not required to go through an authorized "retailer" of the issuer to complete the personalization process. Even though the communication channel is not secure, the remote personalization service can still be performed in a secure manner to ensure the security of the transfer of all proprietary and confidential data between the smart card and the issuer. Once the above mentioned remote personalization process is widely conducted, it will make the smart card issuance system more cost-effective and competitive.

In the open model of distribution of the Smart Card Device, the Smart Card Device is acquired by the customer before it is initialized or personalized. There is no prior knowledge of which service provider/issuer is associated with the Smart Card Device. Since there is no prior knowledge of the issuer, there are some challenges in the initialization and processing of the data. First, since challenges are described below, how to authenticate the service provider/issuer through an insecure public web channel, as there is no proper certificate to be loaded when the Smart Card Device is first manufactured. Second, how to authenticate the Smart Card Device through an insecure public web channel, as the Smart Card Device can be associated with one of many prospective service providers/issuers in the field. Third, how to make Smart Card Device secure, if the initialization and personalization is done by the customer with an access terminal, possibly a PC, through an insecure public web channel.

The above-identified issues of open model are addressed by a system and method in accordance with the present invention. The retail distribution model of the Smart Card Device can then be realized in application of content protection and secure content distribution.

There are several issues that need to be addressed when utilizing the open distribution model when issuing a Smart Card Device. First, it must be determined how to authenticate the Smart Card Device through an insecure public web channel, when the Smart Card Device intends to be associated with one of many prospective service providers/issuers in the field. Second, it must be determined how to authenticate the service provider/issuer through an insecure public web channel, when there is no proper certificate to be loaded when the blank Smart Card Device is first manufactured. Third, it must be determined how to make the Smart Card Device secure, if the initialization and personalization is done by the customer with an access terminal, possibly a PC, through an insecure public web channel.

Before any of above issues can be addressed, there are three tasks to complete before the customer obtains the Smart Card Device: (1) have the Smart Card Device initialized, (2) have the Smart Card Device registered for the first time, and (3) have the Smart Card Device registered and authenticated in the field.

FIG. 2A is a flow chart that illustrates a complete initialization and personalization process of a Smart Card Device. The process starts with the initialization phase of the Smart Card Device (SC) by the manufacturer (MN), via step 200. It is followed by the authentication phase of the SC by the MN, via step 201. After the SC is deployed in the field, it goes through a first time authentication phase of SC by the issuer (IS) 202. The IS then starts a first phase of registration with the SC, via step 203. It is followed by the authentication phase of the SC by the IS after the first time authentication, via step 204. The SC will in turn start an authentication phase on the IS, via step 205. Once both SC and IS are mutually authenticated, the IS starts a second phase of registration, via step 206.

FIG. 2B is a flowchart that illustrates a Data Transmission process of the SC. In this process, the user first goes through the access terminal to conduct Login Phase, via step 207. The SC and IS then go through a mutual authentication phase 208. After mutual authentication, a session key is established. It is used in data transmission phase to encrypt and decrypt data for transmission between IS and SC, via step 209.

Various phases of the initialization and personalization of the SC are described below.

1. Initialization Phase by Manufacturer MN

Figure 3:
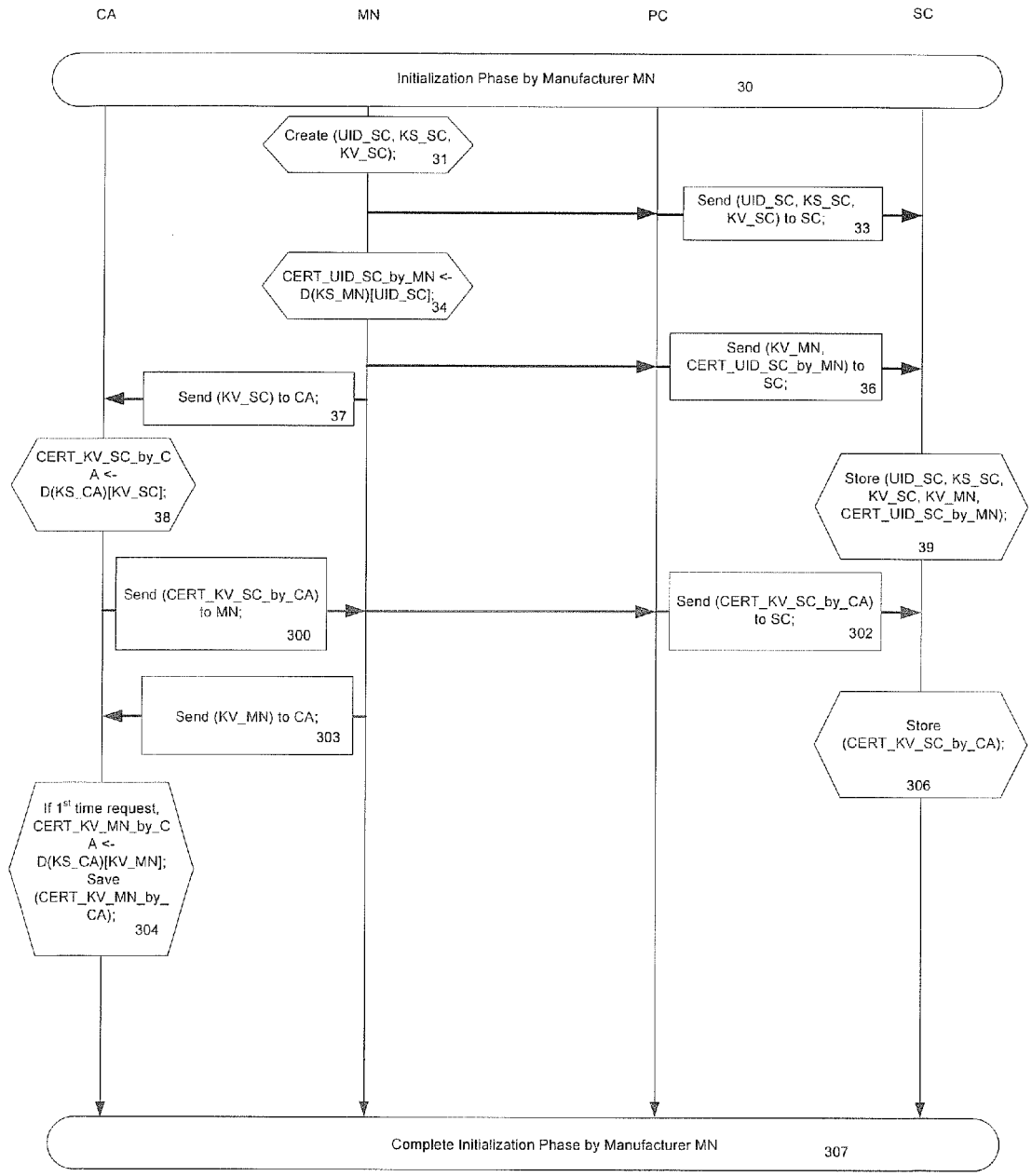
FIG. 3 is a flowchart that illustrates the initialization phase by the manufacturer (MN).

As is shown in FIG. 3, during the manufacturing process, the MN first create a unique ID UID_SC and a pair of keys, private key KS_SC and public key KV_SC, via step 31. The unique ID and keys are then sent to the SC, via step 33. The MN further sends the certificate of the UID, signed with its private key KS_MN, via step 34. The certificate along with the manufacturer public key KV_MN are also sent to SC, via step 36. The SC stores this information (UID_SC, KS_SC, KV_SC, KKV_MN, CERT_UID_SC_by_MN), via step 39. The MN then sends the SC's public key KV_SC to the certificate authority CA, via step 37, for it to sign and generate the certificate CERT_KV_SC_by_CA, via step 300. The certificate is then sent to the SC, via step 302 and is stored by the SC, via step 306. The MN also sends its own public key KV_MN to the certificate authority (CA) to create the signed certificate. If it is the first time that the CA receives the request, it signs with its private key KS_CA and saves the certificate CERT_KV_MN_CA for reference later, via step 304.

2. Authentication Phase of SC by MN

Figure 4:
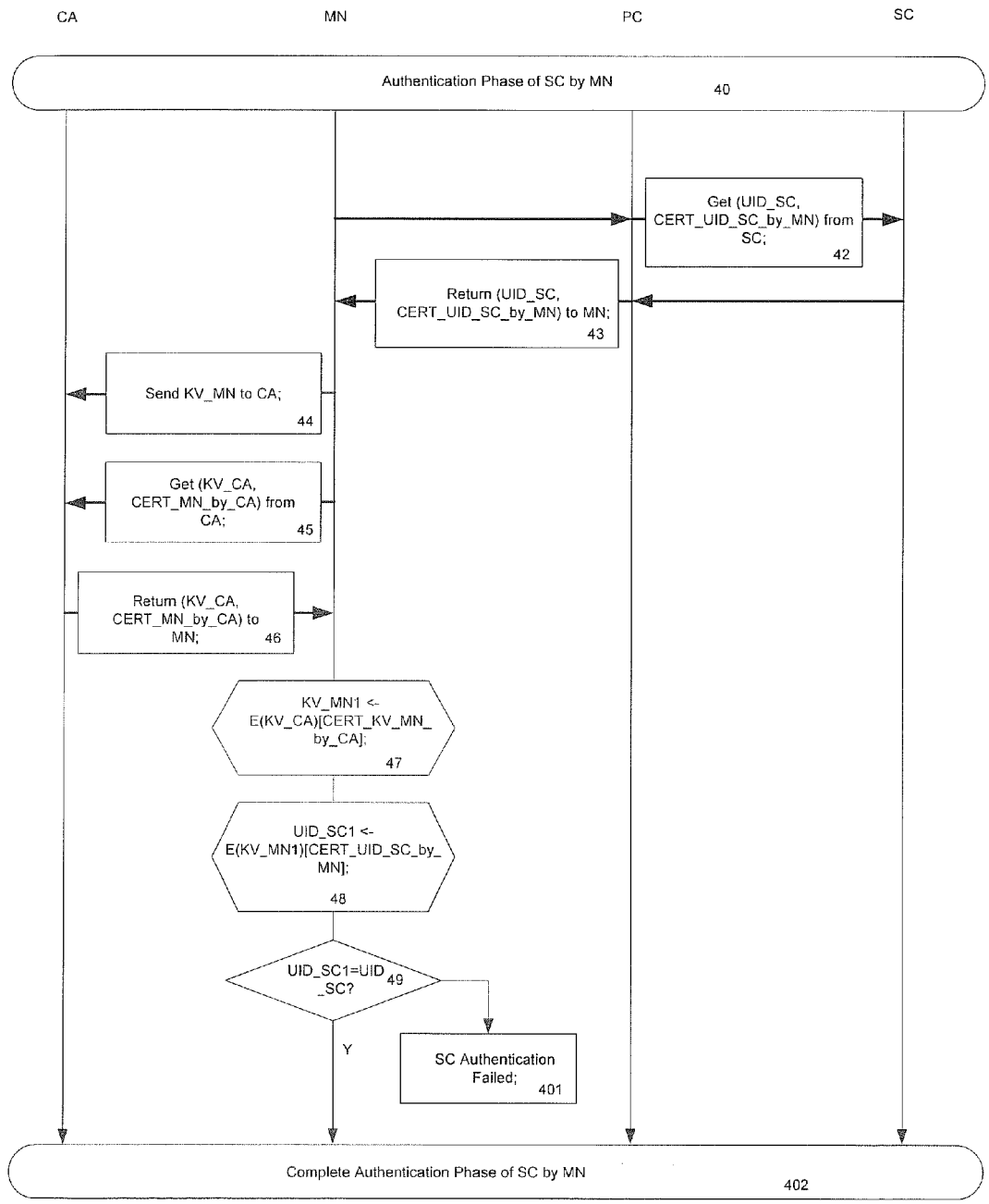
FIG. 4 is a flowchart that illustrates the authentication of the SC by MN.

As is shown in FIG. 4, the MN requests to obtain UID_SC, CERT_UID_SC_by_MN from the SC, via step 42. After receiving UID_SC, CERT_UID_SC_by_MN from the SC, via step 43, the MN sends its public key KV_MN to the CA, via step 44 and requests KV_CA, CERT_MN_by_CA from the CA, via step 45. The CA then returns its public key KV_CA and the previously stored certificate CERT_MN_by_CA corresponding to MN's public key KV_MN, via step 46. The MN then decrypts the public key KV_MN1 from the received data, via step 47. The derived public key KV_MN1 is further used to decrypt the certificate CERT_UID_SC_by_MN and to retrieve the unique ID UID_SC1, via step 48. If the retrieved UID_SC1 is equal to the originally stored UID_SC of the SC, via step 49. Then the SC is authenticated. Otherwise the authentication fails, via step 401. After this point, the SC is ready to deploy in the field.

3. First Time Authentication Phase of SC by IS

Figure 5:
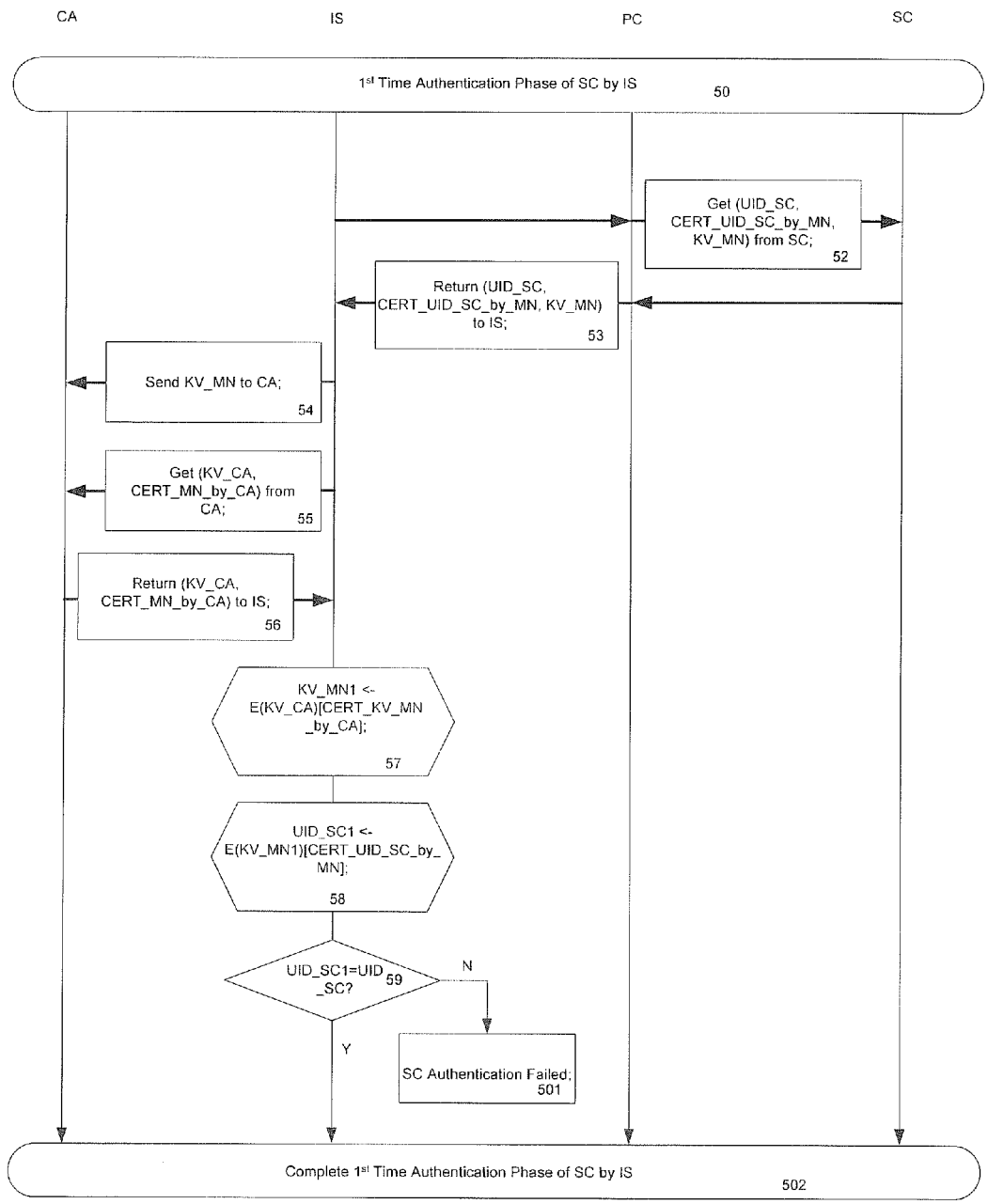
FIG. 5 is a flowchart that illustrates a first time authentication of the SC by an IS.

After the SC is deployed in the field through a distributor and into the possession of the end user, the SC is ready to be associated with the IS for the very first time. But before any further personalization or registration can be done, the SC needs to be authenticated by the issuer IS. As is shown in FIG. 5, the IS requests to obtain UID_SC. CERT_UID_SC_by_MN, KV_MN from the SC, via step 52. After receiving (UID_SC, CERT_UID_SC_by_MN, KV_MN) from the SC, via step 53, the IS sends the received manufacturer public key KV_MN to the CA, via step 54, and obtains KV_CA, CERT_MN_by_CA from the CA, via step 55. The CA then returns its public key KV_CA and looks up the previously stored certificate CERT_MN_by_CA corresponding to MN's public key KV_MN, via step 56. The IS then decrypts the public key KV_MN1 from the received data, via step 57. The derived public key KV_MN1 is further used to decrypt the certificate CERT_UID_SC_by_MN and to retrieve the unique ID UID_SC1, via step 58. If the retrieved UID_SC1 is equal to the originally stored UID_SC of the SC, via step 59, then the SC is authenticated. Otherwise the authentication fails, via step 501.

4. Registration Phase 1

Figure 6:
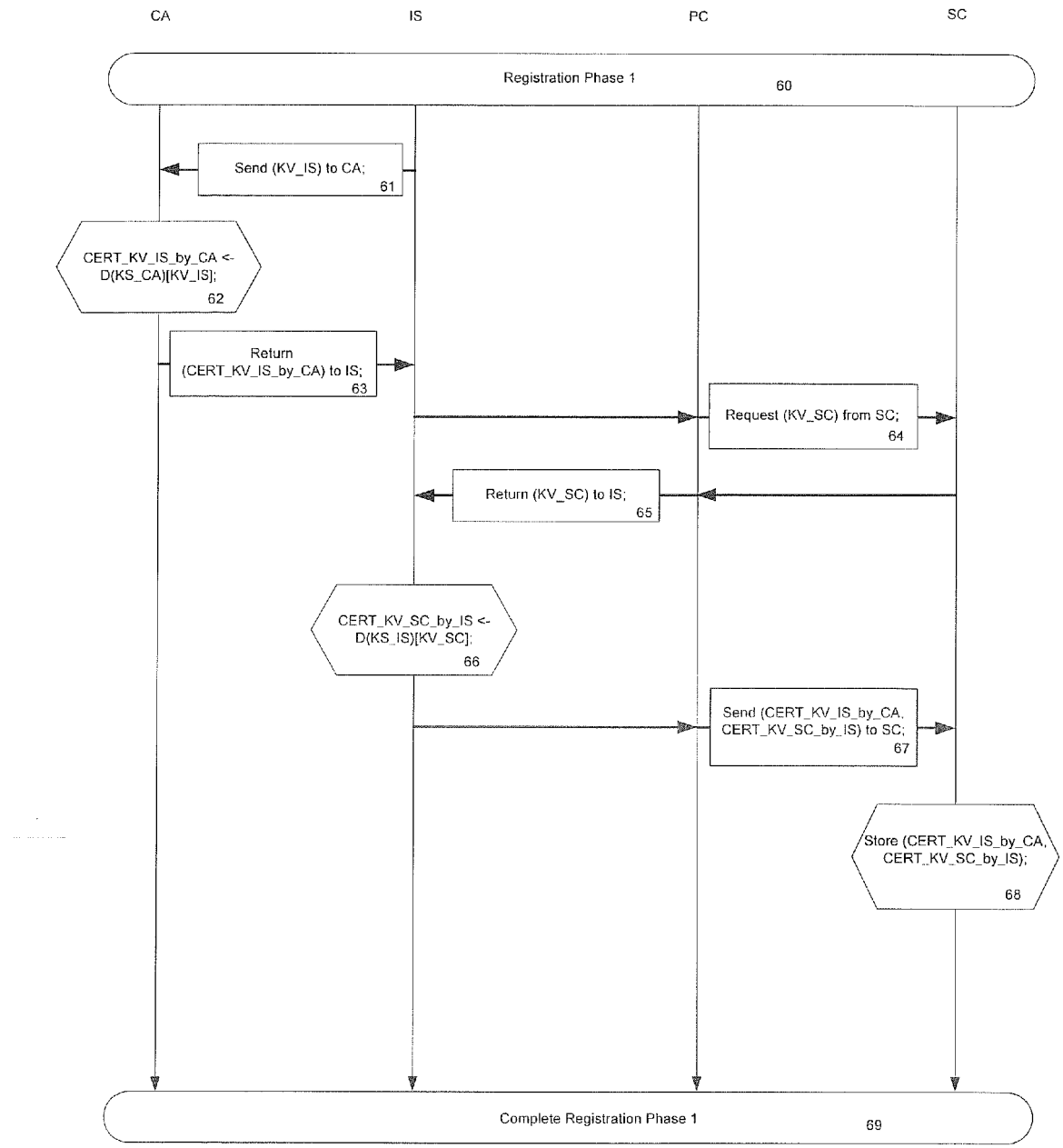
FIG. 6 is a flowchart that illustrates the authentication of the SC by the IS after the first time authentication.

After the SC is authenticated by the IS for the first time, the SC is ready for the first phase of registration. As is shown in FIG. 6, the IS sends its public key KV_IS to the CA, via step 61 and requests a certificate. The CA will sign with its private key KS_CA and generate the certificate CERT_KV_IS_by_CA, via step 62. The certificate is then returned to the IS, via step 63. The IS requests the public key KV_SC from the SC, via step 64. After the IS receives KV_SC, it signs with its own private key KS_IS to generate the certificate CERT_KV_SC_by_IS, via step 66. The IS then sends both certificates (CERT_KV_IS_by_CA, CERT_KV_SC_by_IS) to the SC, via step 67. The SC then stores both certificates for later use, via step 68. At this point, the SC is ready for further personalization.

5. Authentication of SC by IS After First Time Authentication

Figure 7:
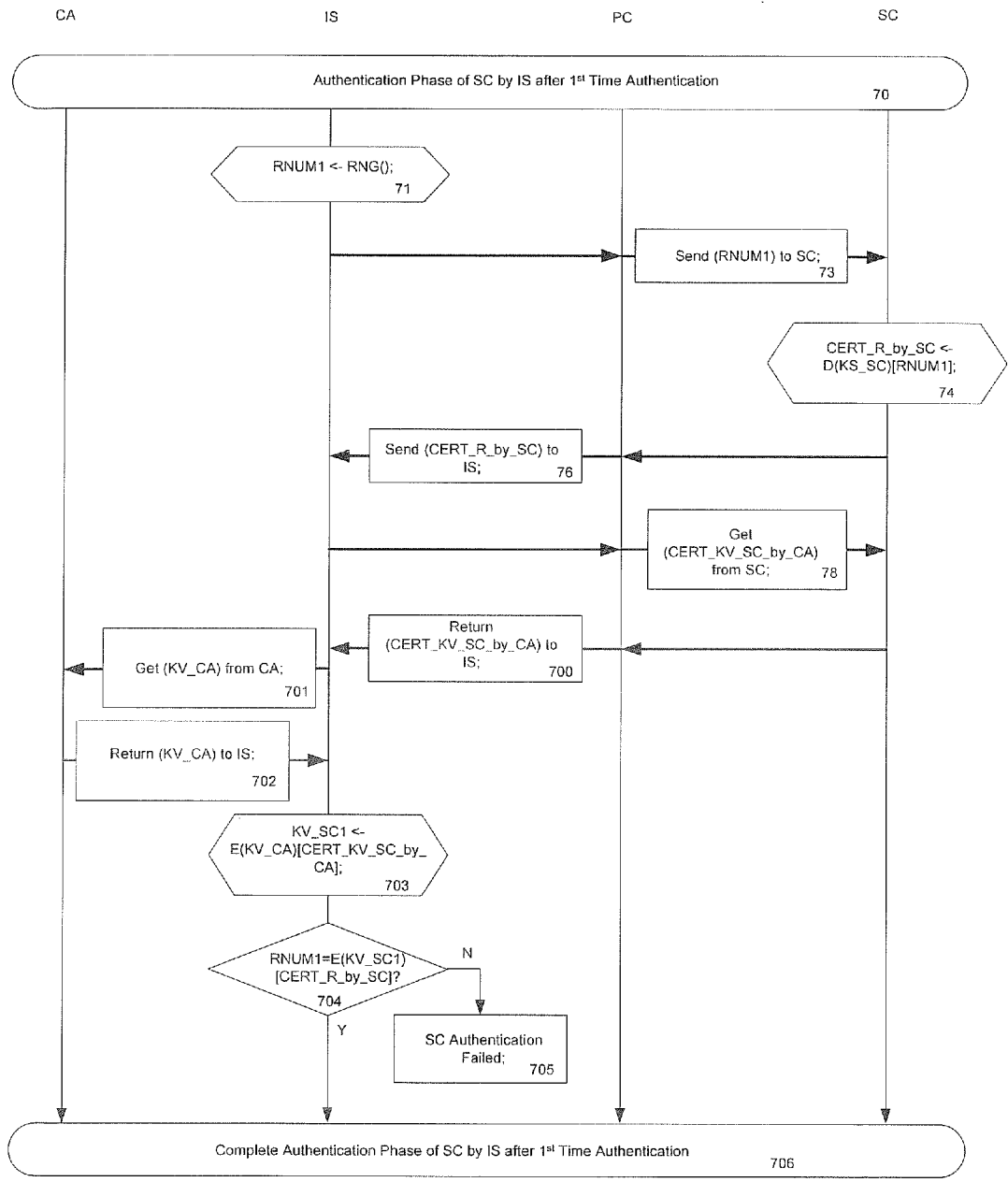
FIG. 7 is a flowchart that illustrates a first registration phase.

As is shown in FIG. 7, the IS first generates a random number RNUM1, via step 71. RNUM1 is then sent to the Smart Card Device SC, via step 73, as a challenge. The random number RNUM1 is signed by the SC private key KS_SC to generate a certificate CERT_R_by_SC, via step 74, and sent back to the IS, via step 76. The IS then requests to obtain the previously stored certificate CERT_KV_SC_by_CA from the SC, via step 78. The returned certificate is retrieved and returned to the IS, via step 700. The IS requests the CA public key KV_CA from the CA, via step 701. After retrieving KV_CA via step 702, the IS uses the CA public key to recover the corresponding SC public key KV_SC1, via step 703. The recovered SC public key KV_SC1 is in turn used to recover the corresponding random number from the certificate CERT_R_by_SC and compared with the original challenged random number RNUM1, via step 704. If the result of the comparison is OK, then the SC is authenticated. Otherwise, the authentication fails, via step 705.

6. Authentication Phase of IS by SC

Figure 8:
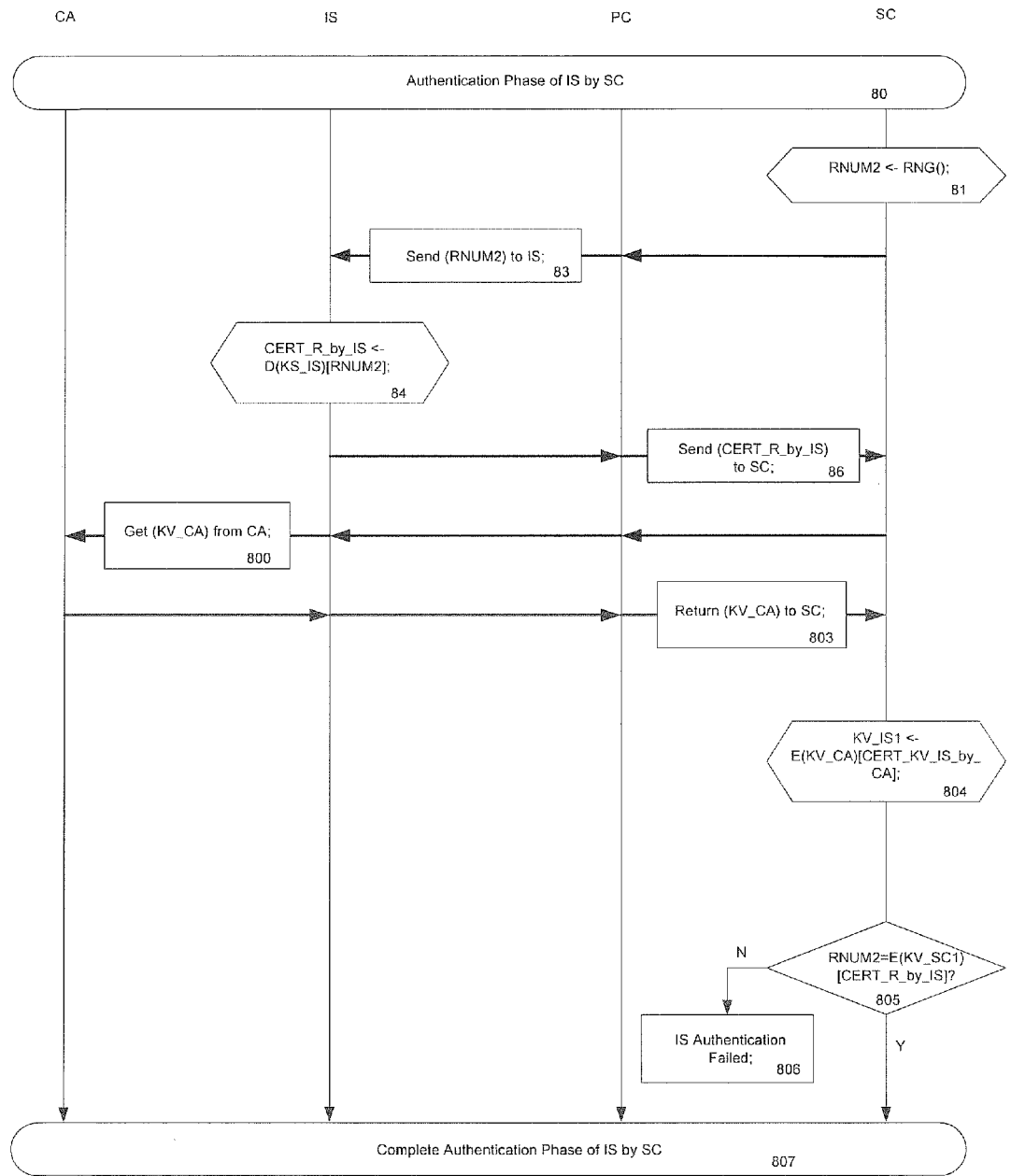
FIG. 8 is a flowchart that illustrates an authentication phase of the IS by the SC.

After the SC is authenticated by the IS, it is SC's turn to authenticate the IS. As is shown in FIG. 8, the SC generates a random number RNUM2, via step 81. The second random number is then sent to the IS as a challenge, via step 83. The IS signs with its private key KS_IS, via step 84, and sends the certificate CERT_R_by_IS back to the SC, via step 86. The SC requests the CA's public key KV_CA, via step 800. The CA returns KV_CA back to the SC, via step 803. The SC retrieves certificate CERT_KV_IS_by_CA from its memory and decrypts with the CA's public key KV_CA, via step 804. The resulting IS public key KV_IS1 is then used to further decrypt the certificate CERT_R_by_IS. The result is compared with the previously generated random number RNUM2, via step 805. If it compares, the IS is authenticated. Otherwise, the authentication fails, via step 806.

7. Registration Phase 2

Figure 9:
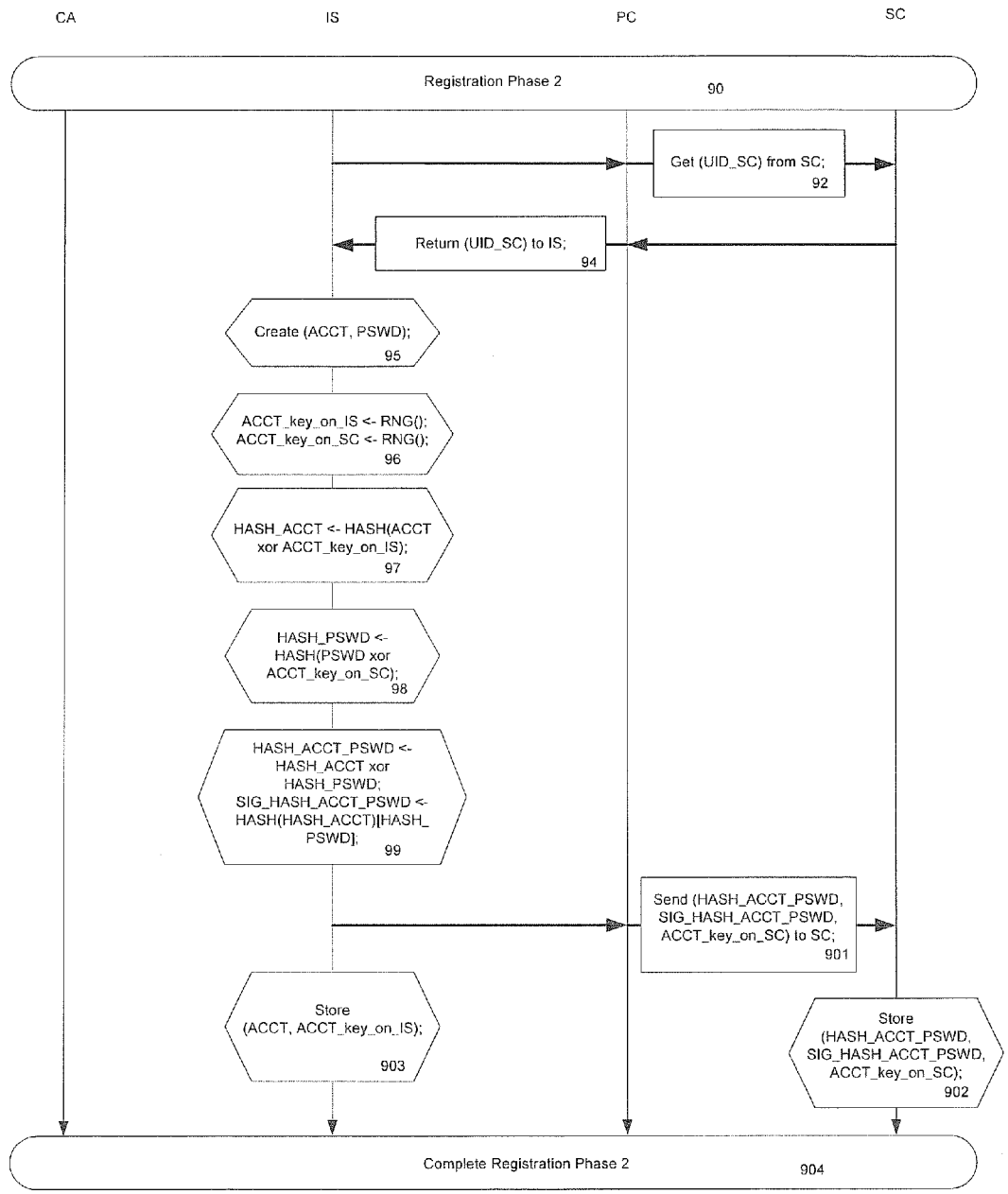
FIG. 9 is a flowchart that illustrates a second registration.

Once IS and SC are mutually authenticated, the issuer IS is ready to conduct the second phase of the registration. As is shown in FIG. 9, the IS requests the unique ID UID_SC from the SC, via step 92. The SC returns the requested data, via step 94. The IS starts the personalization/registration process by first creating a pair of corresponding account name and password (ACCT, PSWD), via step 95. A pair of random numbers (ACCT_key_on_IS, ACCT_key_on_SC) are also generated, via step 96. The account name ACCT is EXCLUSIVE-ORed with the random number ACCT_key_on_IS. Its hash value is generated as HASH_ACCT, via step 97. The corresponding password PSWD is EXCLUSIVE-ORed with the random number ACCT_key_on_SC. Its hash value is generated as HASH_PSWD, via step 98. HASH_ACCT and HASH_PSWD are then EXCLUSIVE-ORed to generate HASH_ACCT_PSWD. HASH_PSWD is further hashed with HASH_ACCT to create a signature SIG_HASH_ACCT_PSWD, via step 99. The data (HASH_ACCT_PSWD, SIG_HASH_ACCT_PSWD, ACCT_key_on_SC) are sent to the SC, via step 901 and re stored accordingly, via step 902. The IS also stores (ACCT, ACCT_key_by_IS) in its data base for later use, via step 903. At this point, the IS has complete registration or personalization of the particular SC. The SC is ready for use.

Login Phase

Figure 10:
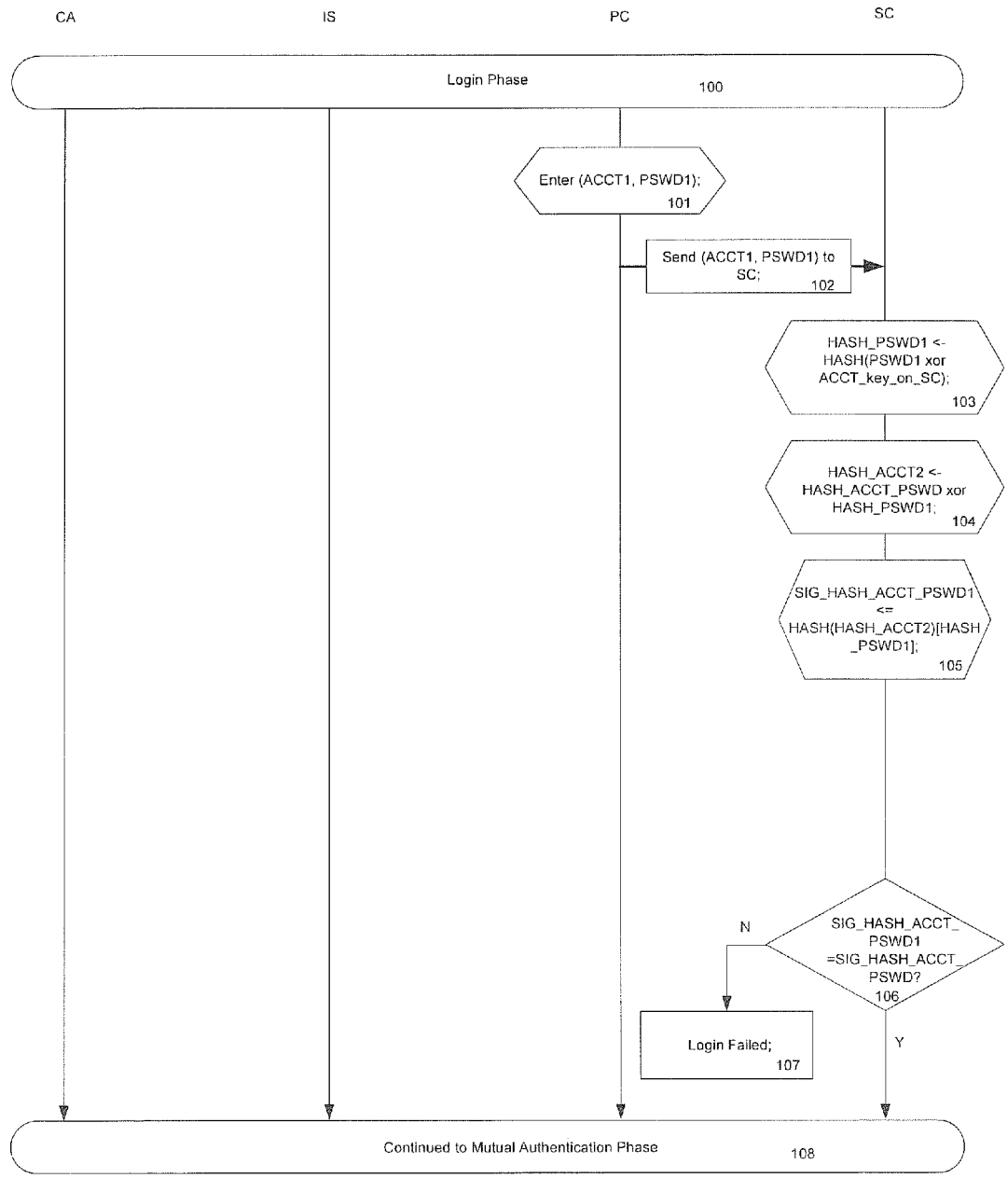
FIG. 10 is a flowchart that illustrates a login phase.

FIG. 10 is a flowchart that illustrates a login process by the user through the access terminal. The user enters the account name ACCT1 and password PSWD1 on the access terminal to log in, via step 101. The account name ACCT1 and password PSWD1 are sent to the SC, via step 102. The SC generates HASH_PSWD1, via step 103. Accordingly HASH_ACCT2 is re-generated from HASH_ACCT_PSWD and HASH_PSWD1, via step 104. The signature SIG_HASH_ACCT_PSWD1 is generated by hashing HASH_ACCT2 and HASH_PSWD1, via step 105. If the signature SIG_HASH_ACCT_PSWD1 matches the previously stored SIG_HASH_ACCT_PSWD via step 106, then login is successful and the operation proceeds with mutual authentication phase, via step 108. Otherwise, the login fails, via step 107.

In order to deploy the Smart Card Device in the field, it is assumed that all communication channels are insecure, between the PC and the SC, between the PC and the IS, and between the IS and the CA.

Further to improve the security of the communication, a challenge and response mechanism is added for the bi-directional communication between the parties.

Further to improve the security of the communication, a challenge and response mechanism is added generate a session key for the bi-directional communication between the parties.

There exists proven mechanisms, including Diffie-Hellman (D-H) key exchange, to generate on demand a common shared key SK between two parties intending for communication through an insecure network.

But the Diffie-Hellman key exchange mechanism requires longer time than other key exchange mechanism. It is one of the purposes of this invention to supplement with other key exchange mechanisms to the conventional D-H key exchange mechanism.

1. Mutual Authentication Phase

Figure 11:
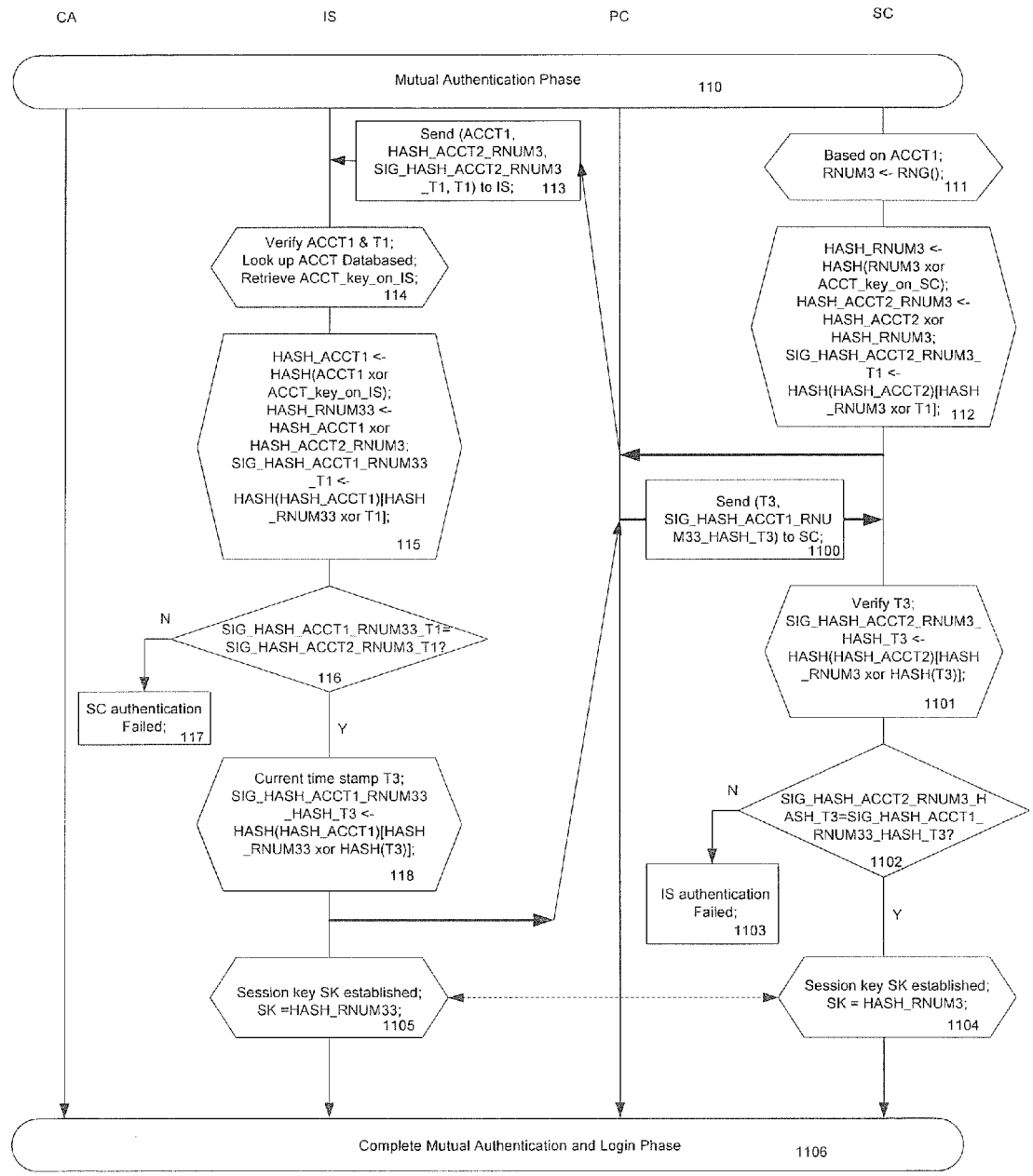
FIG. 11 is a flowchart that illustrates a mutual authentication phase.

FIG. 11 is a flowchart that illustrates a mutual authentication phase of the IS and the SC. After login is successful, the SC generates a random number RNUM3, via step 111.

HASH_RNUM3 is generated from RNUM3 and ACCT_key_on_SC, via step 112. HASH_ACCT2_RUM3 is also generated accordingly. A signature SIG_HASH_ACCT2_RNUM3_T1 is generated based on the current time stamp T1 on the SC, via step 112. The account name ACCT1, hashed value HASH_ACCT2_RNUM3, the signature SIG_HASH_ACCT1_RNUM3_T1 and the time stamp T1 are sent to the IS, via step 113. The IS then verifies the validity of ACCT1 and the time stamp T1. If verification is OK, then the IS looks up its account database and retrieves the corresponding account secret key ACCT_key_on_IS, via step 114. Accordingly, HASH_ACCT1_HASH_RNUM33 and the signature SIG_HASH_ACCT1_RNUM33_T1 are generated, via step 115. The two signatures are compared, via step 116. If the comparison fails, the SC authentication fails, via step 117. Otherwise, the IS looks up its current time stamp and creates a new signature SIG_HASH_ACCT1_RNUM33_HASH_T3, based on the hashed time stamp of T3, via step 118. The reason of the hashed time stamp HASH(T3) is to avoid the possible replay attack. The time stamp T3 and the new signature SIG_HASH_ACCT1_RNUM33_HASH_T3 are then sent to the SC, via step 1100. The SC verifies the time stamp T3 to make sure it is valid. Accordingly, a new signature SIG_HASH_ACCT2_RNUM3_HASH_T3 is generated, via step 1101. The new signature is compared with the just received signature SIG_HASH_ACCT2_RNUM3_HASH_T3, via step 1102. If the comparison fails, the IS authentication fails, via step 1103. Otherwise, the IS is authenticated and the mutual authentication is complete. At this point, a session key SK has been established. The session key for the Smart Card Device is HASH_RNUM3, which is associated with the just generated random number RNUM3 and the secret key ACCT_key_on_SC. The session key for the issuer IS is HASH_RNUM33, via step 1105, which logically is the same as HASH_RNUM3.

2. Data Transmission Phase

Figure 12:
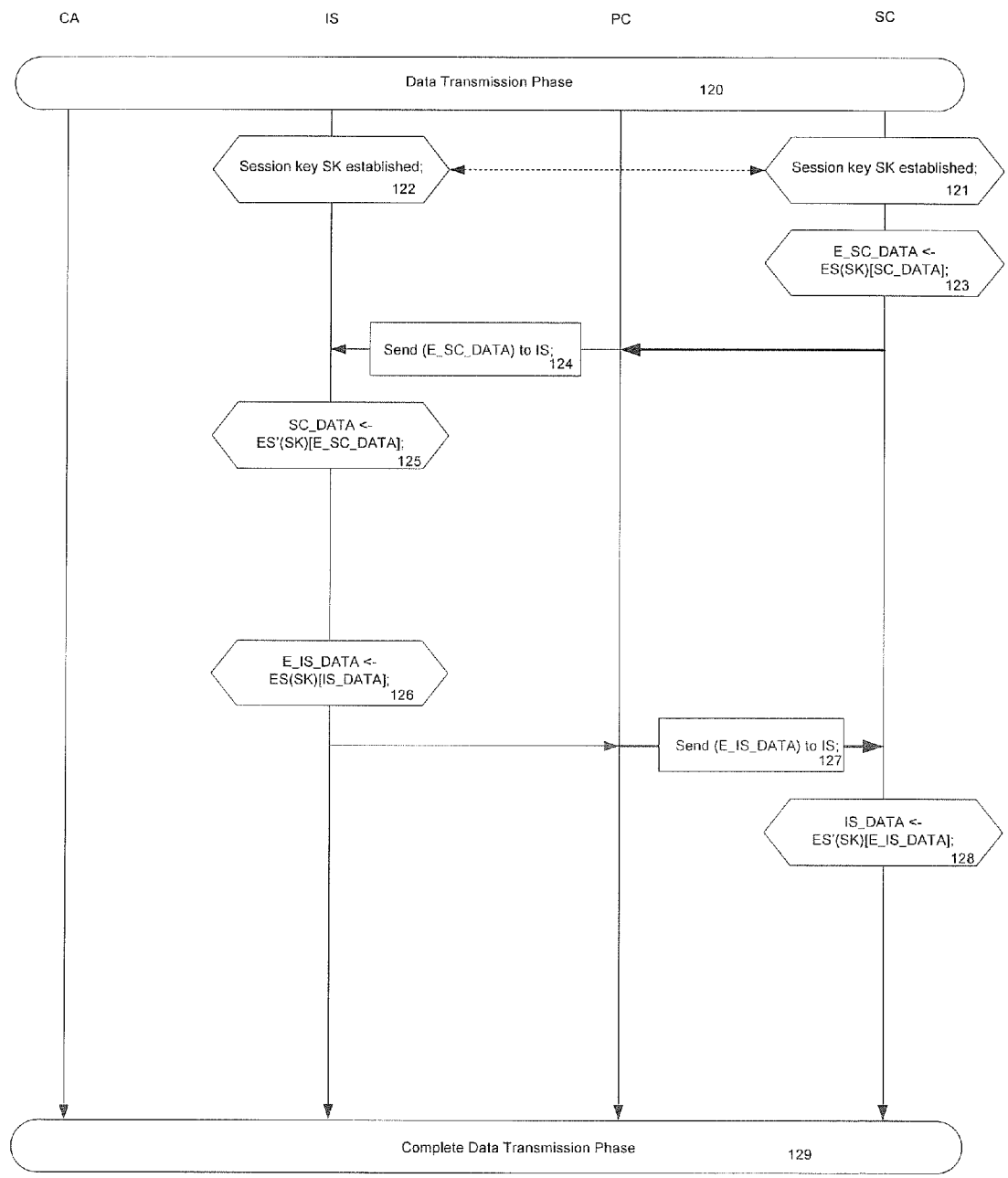
FIG. 12 is a flowchart that illustrates a data transmission phase.

FIG. 12 is a flowchart that illustrates a data transmission phase after the mutual authentication is completed. A session key is therefore established and used as the encryption/decryption key between the two transmission parties. Once the session key SY is established via steps 121 and 122, the key can be used as a mutually agreed secret key to transmit data between the IS and the SC. If the SC wants to send SC_DATA to the issuer, the SC_DATA is first encrypted with session key SK and generates an encrypted data E_SC_DATA, via step 123. The encrypted data is then sent to the IS through the public insecure communication channel, via step 124. The encrypted data is then decrypted with the previously agreed session key SK and generates the SC_DATA on the receiving end of the IS, via step 125.

Similarly, if the IS intends to send IS_DATA to the SC, the IS_DATA is first encrypted with session key SK and generates an encrypted data E_IS_DATA, via step 126. The encrypted data is then sent to the SC through the public insecure communication channel, via step 127. The encrypted data is then decrypted with the previously agreed session key SK and generates the IS_DATA on the receiving end of the SC, via step 128.

3. Change Password Phase

Figure 13:
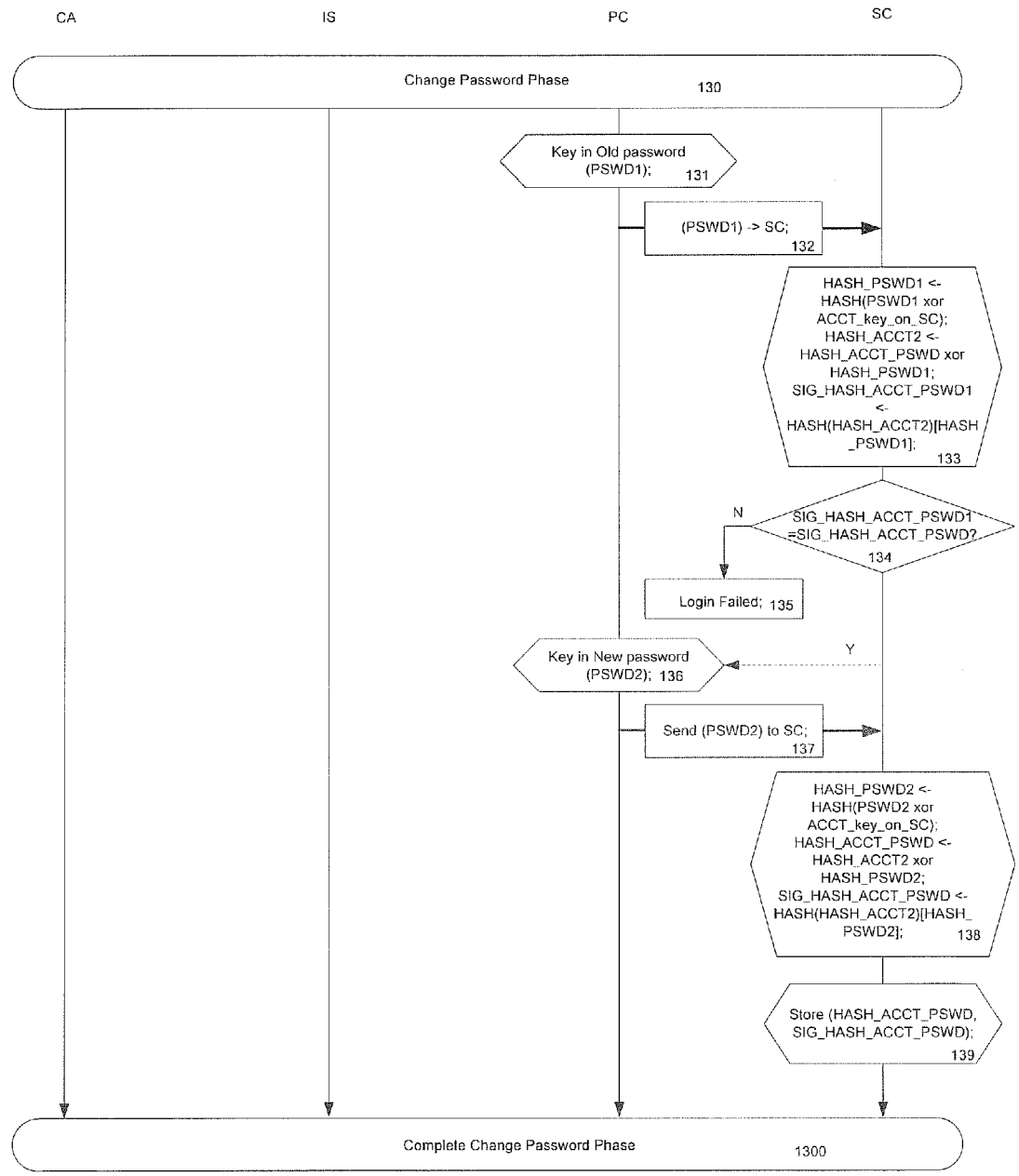
FIG. 13 is a flowchart that illustrates a change password phase.

FIG. 13 is a flowchart which illustrates a change password process, which requires no issuer server involvement. There are times when the user password needs to be changed. Ideally, the change password process requires as little attention of the issuer as possible. In this embodiment, no involvement of the issuer server is required at all in the password changing process, while maintaining the security and the integrity of the SC.

The user first keys in the old password PSWD1 at an access terminal, via step 131. The password is then sent to the SC, via step 132. The corresponding hashed password HASH_PSWD1 is generated. Accordingly, the hashed account name HASH_ACCT2 is re-generated from HASH PSWD1 and the previously stored HASH_ACCT_PSWD. The signature SIG_HASH_ACCT_PSWD1 is also generated from HASH_ACCT2 and HASH_PSWD1, via step 133. The signature is then compared with the originally stored signature SIG_HASH_ACCT_PSWD, via step 134. If the comparison fails, the login fails. Otherwise, the login is successful. The user is prompted to key in a new password PSWD2, via step 136. The new password PSWD2 is sent to the SC, via step 137. The HASH_PSWD2 is generated with the new password PSWD2 and the secret key ACCT_key_on_SC. The HASH_ACCT_PSWD is updated with the previously retrieved HASH_ACCT2 and the newly generated HASH_PSWD2. The signature SIG_HASH_ACCT_PSWD is also updated with HASH_ACCT2 and HASH_PSWD2, via step 138. Both updated HASH_ACCT_PSWD and SIG_HASH_ACCT_PSWD are stored on the Smart Card Device for later use, via step 139.

Alternate Exemplary Embodiment

Although the invention addresses "Smart Card Device" specifically, its application applies to IC card or smart card in general as well as to any other interface, such as SD or microSD, with a built-in smart card.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed:

1. A system for issuing a smart card device (SC) using an open model, the system comprising:
   a manufacturer, wherein the manufacturer provides an initialization phase of the SC and an authentication phase of the SC;
   an issuer, wherein the issuer authenticates the SC for a specific customer via an initial authentication phase, wherein the issuer registers the SC for the specific customer via an initial registration phase, wherein a mutual authentication occurs comprising authentication by the issuer of the SC via a further authentication phase and authentication by the SC of the issuer, and wherein the issuer completes registration of the SC for the specific customer via a further registration phase;
   a remote access terminal, wherein after the specific customer purchases the SC via a retail channel, the specific customer initializes and personalizes the SC via the remote access terminal using a login process that connects to a server of the issuer to provide a personalized SC.

2. The system of claim 1, wherein the SC is initialized and personalized by the specific customer remotely in the field.

3. The system of claim 1, wherein the SC is associated with an account setup with a content/service provider for issuance consideration by the content/service provider.

4. A method for issuing a smart card device (SC) using an open model, the method comprising:
- initializing and authenticating the SC by a manufacturer;
- authenticating the SC for a specific customer by an issuer via an initial authentication phase;
- registering the SC for the specific customer by the issuer via an initial registration phase;
- mutually authenticating both the SC for the specific customer by the issuer via a further authentication phase and the issuer by the SC;
- completely registering the SC for the specific customer by the issuer via a further registration phase;
- purchasing the SC by the specific customer through a retail channel; and
- initializing and personalizing the SC by the specific customer via a remote access terminal using a login process that connects to a server of the issuer to provide a personalized SC.

5. The method of claim 4, wherein the SC is initialized and personalized by the specific customer remotely in the field.

6. The method of claim 4, wherein the SC is associated with an account setup with a content/service provider for issuance consideration by the content/service provider.

7. The method of claim 4, further comprising:
- performing a login of the SC by a user via the remote access terminal;
- performing a mutual authentication of the SC and the issuer; and
- establishing a session key after mutual authentication is established, wherein the session key is used to decrypt data for transmission between the SC and the issuer.

* * * * *